US011947297B2

(12) United States Patent
Takuwa

(10) Patent No.: US 11,947,297 B2
(45) Date of Patent: Apr. 2, 2024

(54) IMAGE FORMING DEVICE

(71) Applicant: TOSHIBA TEC KABUSHIKI KAISHA, Tokyo (JP)

(72) Inventor: Noriyuki Takuwa, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/898,675

(22) Filed: Aug. 30, 2022

(65) Prior Publication Data

US 2024/0069477 A1 Feb. 29, 2024

(51) Int. Cl.
*G03G 15/00* (2006.01)
*G03G 21/16* (2006.01)

(52) U.S. Cl.
CPC ..... *G03G 15/5016* (2013.01); *G03G 21/1623* (2013.01)

(58) Field of Classification Search
CPC ........... G03G 15/5016; G03G 21/1619; G03G 21/1623; G03G 21/1628; G03G 21/1633; G03G 21/1642
See application file for complete search history.

(56) References Cited

U.S. PATENT DOCUMENTS

2009/0059262 A1* 3/2009 Takuwa ............... G03G 21/206 358/1.13

FOREIGN PATENT DOCUMENTS

| | | |
|---|---|---|
| JP | 11-231756 | 8/1999 |
| JP | 2006-27840 | 2/2006 |
| JP | 2019-139188 | 8/2019 |

* cited by examiner

*Primary Examiner* — Hoang X Ngo
(74) *Attorney, Agent, or Firm* — Amin, Turocy & Watson, LLP

(57) ABSTRACT

An image forming device of an embodiment includes an image forming unit, a first toner cartridge, an accommodating unit, and a transfer belt. The image forming unit is configured to form a toner image having at least one color. The first toner cartridge is configured to accommodate a toner having a first color to be supplied to the image forming unit. The accommodating unit is provided in a space where at least one toner cartridge accommodating a toner having a color different from the first color to be supplied to the image forming unit is disposable side by side with the first toner cartridge. The transfer belt is disposed to be travelable through the image forming unit, disposed to face the first toner cartridge and the accommodating unit, and is configured to transfer the toner image formed by the image forming unit.

16 Claims, 9 Drawing Sheets

IMAGE FORMING DEVICE

FIELD

Embodiments described herein relate generally to an image forming device.

BACKGROUND

An image forming device installed in workplaces or the like includes, in addition to a device for forming a color image (hereinafter referred to as a color device), a device for forming only a monochrome image (hereinafter referred to as a monochrome device). The monochrome device includes many parts that can be used in common with the color device. Thus, there is a monochrome device having a structure in which parts unnecessary for forming a monochrome image are removed from the parts of the color device. The unnecessary parts for the monochrome device include exposure optics excluding that for black, process units for colors other than black, and toner cartridges excluding that for black.

For example, a monochrome device from which unnecessary parts other than that for black are removed from the color device includes a housing same as that of the color device. That is, a space inside the housing from which the process units and the toner cartridges other than those for black are removed is a relatively large space. Such a space becomes a useless space.

DETAILED DESCRIPTION

Figure 1:
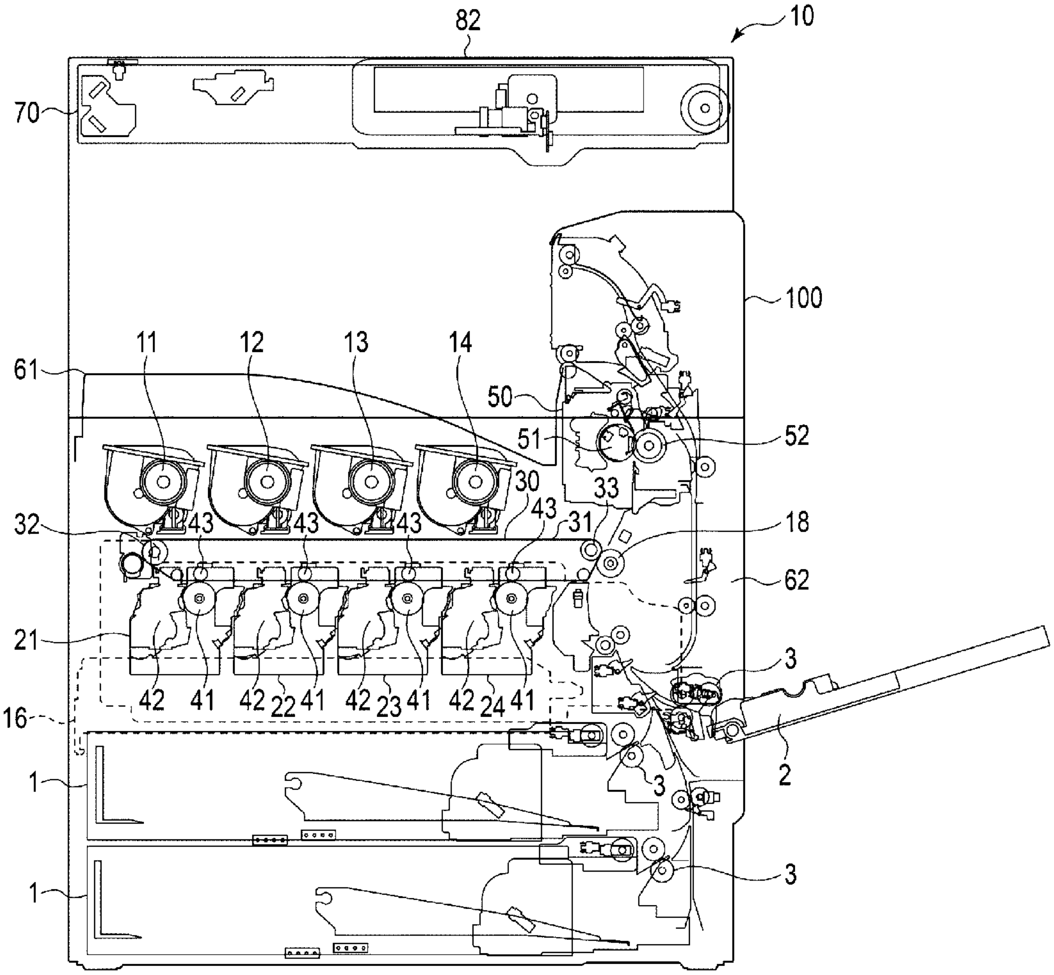
FIG. 1 is a schematic view showing a color multifunction device which is an image forming device according to a reference example.

In general, according to one embodiment, an image forming device includes an image forming unit, a first toner cartridge, an accommodating unit, and a transfer belt. The image forming unit is configured to form a toner image having at least one color. The first toner cartridge is configured to accommodate a toner having a first color to be supplied to the image forming unit. The accommodating unit is provided in a space where at least one toner cartridge accommodating a toner having a color different from the first color to be supplied to the image forming unit is arrangeable side by side with the first toner cartridge. The transfer belt is disposed to be travelable through the image forming unit, disposed to face the first toner cartridge and the accommodating unit, and is configured to transfer the toner image formed by the image forming unit.

Before describing an image forming device according to an embodiment, a color multifunction device 10 which is an image forming device according to a reference example will be described with reference to FIG. 1.

The color multifunction device 10 is provided with many functions such as a printing function, a scanning function, a copying function, and a facsimile function. The printing function is a function of forming a toner image on a sheet. The scanning function is a function of reading an image from a document. The copying function is a function of printing the image read from the document obtained by using the scanning function on the sheet obtained by using the printing function. The facsimile function is a function of printing on the sheet, using the printing function, an image based on data received using a communication line, and transmitting, using the communication line, the image data read from the document obtained by using the scanning function.

The color multifunction device 10 includes a plurality of sheet feed cassettes 1, a manual feed tray 2, and a plurality of sheet feed rollers 3. The sheet feed cassette 1 accommodates a plurality of sheets used for printing. The manual feed tray 2 is used for manually feeding a sheet in a state in which the plurality of sheets are stacked. The sheet feed roller 3 picks up the sheet accommodated in the sheet feed cassette 1 one by one, and also picks up the sheet placed in the manual feed tray 2 one by sheet.

The color multifunction device 10 includes a plurality of toner cartridges 11, 12, 13, and 14, a plurality of image forming units 21, 22, 23, and 24, an exposure device 16, a transfer belt unit 30, and a secondary transfer roller 18. The color multifunction device 10 includes the plurality of toner cartridges 11, 12, 13, and 14 arranged side by side in a substantially horizontal direction along a traveling direction of a transfer belt 31. The color multifunction device 10 includes the plurality of toner cartridges 11, 12, 13, and 14 facing an upper side of the transfer belt unit 30 in the drawing. The color multifunction device 10 includes the plurality of image forming units 21, 22, 23, and 24 side by side in the substantially horizontal direction along the traveling direction of the transfer belt 31. The color multifunction device 10 includes the plurality of image forming units 21, 22, 23, and 24 facing a lower side of the transfer belt unit 30 in the drawing.

The toner cartridges 11, 12, 13, and 14 accommodate toners having respective colors to be supplied to the image forming units 21, 22, 23, and 24. The leftmost toner cartridge 11 in FIG. 1 accommodates a yellow toner. The second toner cartridge 12 from the left accommodates a magenta toner. The third toner cartridge 13 from the left accommodates a cyan toner. The rightmost toner cartridge 14 accommodates a black toner.

The image forming units 21, 22, 23, and 24 receive a toner supplied from the toner cartridges 11, 12, 13, and 14, respectively, and form toner images having different colors. The leftmost image forming unit 21 in FIG. 1 forms a yellow (Y) toner image. The second image forming unit 22 from the left forms a magenta (M) toner image. The third image forming unit 23 from the left forms a cyan (C) toner image. The rightmost image forming unit 24 forms a black (K) toner image.

The image forming units 21, 22, 23, and 24 include substantially the same configuration except for a difference in toner. Thus, here, the image forming unit 24 for black will be described as a representative, and the description of the image forming units 21, 22, and 23 for other colors will be omitted.

The image forming unit 24 that forms the black toner image includes a photoconductor drum 41 in contact with a surface of the transfer belt 31. The image forming units 21, 22, 23, and 24 having respective colors are disposed on the respective photoconductor drums 41 at an equal interval along the traveling direction of the transfer belt 31. In addition, the image forming unit 24 includes a charging unit (not shown), a developing device 42, a primary transfer roller 43, a cleaner (not shown), and a static elimination lamp (not shown) disposed along the rotation direction of the photoconductor drum 41.

The photoconductor drum 41 has a cylindrical surface that receives a light beam emitted from the exposure device 16. The light beam is a light beam based on black image data obtained by color-separated image data read from a document by a scanner 70 described later or image data input from the outside of the color multifunction device 10. The exposure device 16 exposes and scans, with the rotation of the photoconductor drum 41, the surface of the photoconductor drum 41 by the light beam, and forms an electrostatic latent image based on the black image data on the surface of the photoconductor drum 41.

The charging unit charges the surface of the photoconductor drum 41 before the surface is exposed to a predetermined potential. The developing device 42 develops the electrostatic latent image on the surface of the photoconductor drum 41 with the black toner supplied from the toner cartridge 14. That is, the developing device 42 forms a black toner image on the surface of the photoconductor drum 41.

The primary transfer roller 43 faces the surface of the photoconductor drum 41, and the transfer belt 31 of the transfer belt unit 30 is sandwiched between the primary transfer roller 43 and the photoconductor drum 41. The primary transfer roller 43 generates a transfer voltage between the primary transfer roller 43 and the photoconductor drum 41. With this transfer voltage, the primary transfer roller 43 transfers (primarily transfers) the black toner image formed on the surface of the photoconductor drum 41 to the surface of the transfer belt 31 in contact with the photoconductor drum 41.

The cleaner removes the black toner remaining on the surface of the photoconductor drum 41. The static elimination lamp removes an electric charge remaining on the surface of the photoconductor drum 41.

The exposure device 16 irradiates the surface of the photoconductor drums 41 corresponding to the image forming units 21, 22, 23, and 24 with light beams having respective colors according to color-separated image data of respective colors. The light beams having respective colors are used for forming yellow, magenta, cyan, and black images.

For example, the exposure device 16 controls the black light beam according to the black image data to form a black electrostatic latent image on the surface of the photoconductor drum 41 corresponding to the image forming unit 24. Similarly, the exposure device 16 controls, according to a yellow component, a magenta component, and a cyan component in the image data, the light beams having the three colors to form electrostatic latent images for yellow, magenta, and cyan on the surface of the photoconductor drums 41 corresponding to the image forming units 21, 22, and 23, respectively.

The transfer belt unit 30 includes the endless transfer belt 31 and two rollers for winding and stretching the transfer belt 31. These two rollers include a driven roller 32 and a driving roller 33. In addition, the transfer belt unit 30 includes a tension roller for applying tension to the transfer belt 31. The transfer belt 31 rotates with the rotation of the driving roller 33. The transfer belt 31 rotates in a counterclockwise direction in FIG. 1 to convey the toner images having respective colors transferred from the image forming units 21, 22, 23, and 24 to the secondary transfer roller 18.

The secondary transfer roller 18 faces a surface of the driving roller 33 with the transfer belt 31 sandwiched between the secondary transfer roller 18 and the driving roller 33, and generates a transfer voltage between the secondary transfer roller 18 and the driving roller 33. The secondary transfer roller 18 transfers (secondarily transfers), with the transfer voltage, the toner images having respective colors superimposed and transferred on the surface of the transfer belt 31 to a sheet conveyed between the transfer belt 31 and the secondary transfer roller 18.

The color multifunction device 10 also includes a fixing device 50. The fixing device 50 heats and pressurizes the sheet on which the toner images having respective colors are transferred. Accordingly, the toner images having respective colors transferred to the sheet are fixed on the sheet. The fixing device 50 includes a heating roller 51 and a pressurizing roller 52 facing each other with a sheet conveyance path in between.

The heating roller 51 includes a heat source for heating the heating roller 51. The heat source is, for example, a heater. The heating roller 51 heated by the heat source heats the sheet to a melting temperature of the toner. The pressure roller 52 pressurizes the sheet passing between the pressurizing roller 52 and the heating roller 51.

The color multifunction device 10 also includes a sheet discharge tray 61, a duplex printing unit 62, the scanner 70, and a document feed device (not shown).

The sheet discharge tray 61 receives the sheet discharged after the printing is completed. The duplex printing unit 62 makes the sheet ready for printing on a back side. For example, the duplex printing unit 62 flips the front and back of the sheet by switching back the sheet using a roller or the like, and feeds the sheet to the image forming unit. The scanner 70 reads an image from the document. The scanner 70 reads the image by an optical reduction method including an image pickup device such as a charge-coupled device (CCD) image sensor. Alternatively, the scanner 70 reads the image by a contact image sensor (CIS) method including an image pickup device such as a complementary metal-oxide-semiconductor (CMOS) image sensor. The document feed device is also called, for example, an auto document feeder (ADF). The document feed device conveys documents (not shown) one after another through a document glass 82. The scanner 70 reads the image of the document conveyed to the document glass 82.

Hereinafter, a monochrome multifunction device 110, which is the image forming device according to the embodiment, will be described with reference to FIGS. 2 to 10.

Figure 2:
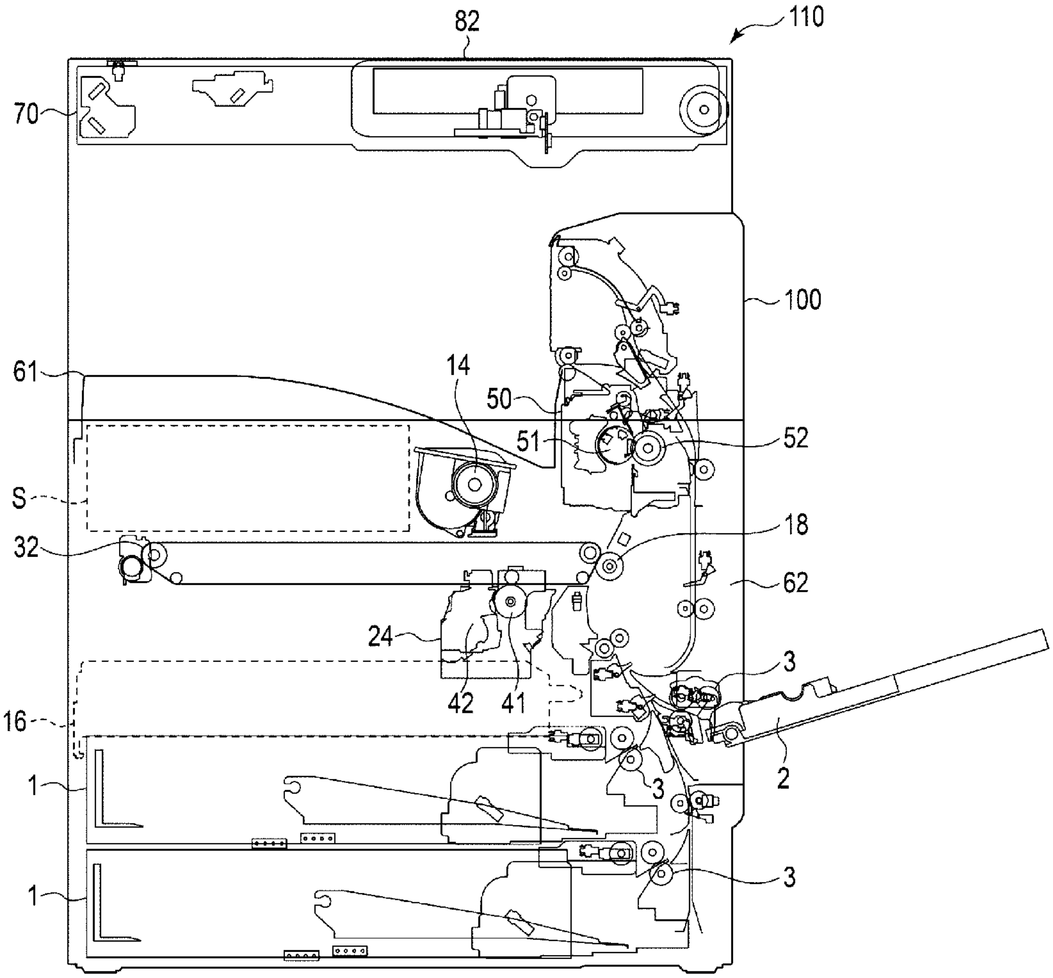
FIG. 2 is a schematic view showing a monochrome multifunction device which is an image forming device according to an embodiment.

The color multifunction device 10 described above can be used, by removing some parts, as the monochrome multifunction device 110, as shown in FIG. 2. That is, the monochrome multifunction device 110 shown in FIG. 2 has a structure in which components not used for forming a monochrome image are removed from the color multifunction device 10 in FIG. 1. In this case, the unnecessary components include, for example, the image forming unit 21 for yellow, the image forming unit 22 for magenta, the image forming unit 23 for cyan, the toner cartridge 11 accommodating a yellow toner, the toner cartridge 12 accommodating a magenta toner, and the toner cartridge 13 accommodating a cyan toner. Further, the exposure optical element for yellow, the exposure optical element for magenta, and the exposure optical element for cyan in the exposure device 16 are also unnecessary components.

The color multifunction device 10 in FIG. 1 and the monochrome multifunction device 110 in the present embodiment use a same housing 100. Accordingly, after removing, for example, the toner cartridges 11, 12, and 13 of the three colors from the color multifunction device 10 in FIG. 1, as shown in FIG. 2, a space S having a size in which the three toner cartridges 11, 12, and 13 can be disposed is generated in the housing 100 of the monochrome multifunction device 110. The monochrome multifunction device 110 has the space S disposed horizontally on a left side of the black toner cartridge 14 in the drawing. The black toner cartridge 14 functions as a first toner cartridge.

Since the three toner cartridges 11, 12, and 13 are disposed horizontally along the transfer belt 31, the space S is a relatively large space expanding in the horizontal direction. Specifically, the space S is large enough to accommodate a bundle of A4 size sheets. The image forming device in the present embodiment is the monochrome multifunction device 110 that uses this space S as an accommodating unit 120. In FIG. 2, the accommodating unit 120 is not shown for the sake of clarity. In the following description, the same reference numerals are given to the configurations that function in the same manner as the color multifunction device 10 described above, and detailed description thereof will be omitted.

Figure 3:
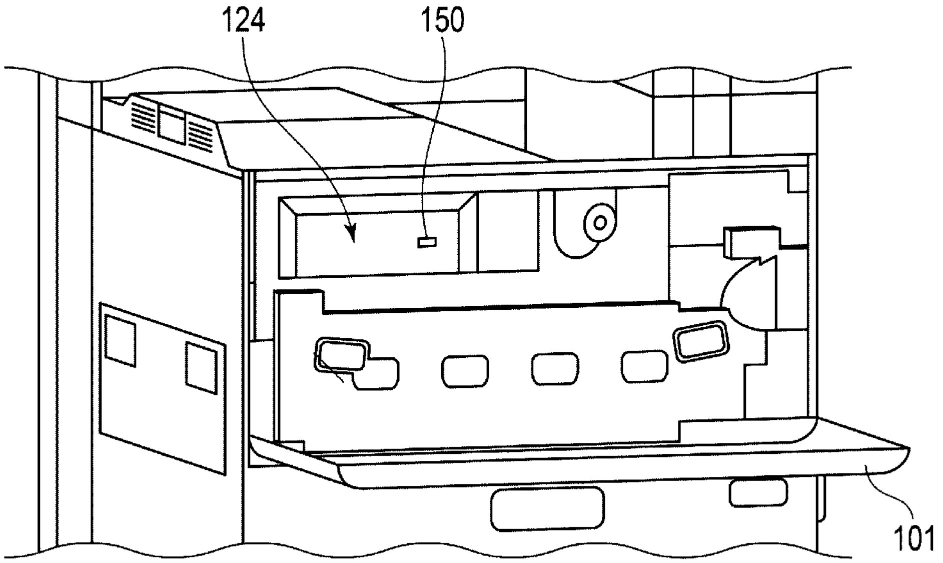
FIG. 3 is a perspective view showing a state in which a lid body of an accommodating unit is closed.
Figure 4:
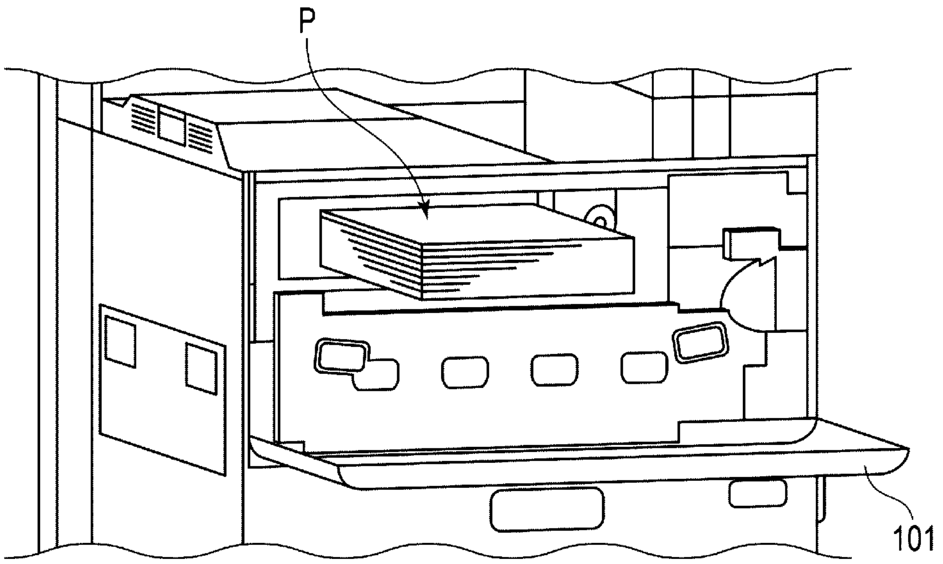
FIG. 4 is a perspective view showing a state in which a sheet is accommodated in the accommodating unit.

As shown in FIGS. 3 and 4, for example, a sheet bundle P in which a plurality of sheets are stacked can be accommodated in the accommodating unit 120. The sheet bundle P can be accommodated in the accommodating unit 120 in a state in which a plurality of loose sheets from which a wrapping sheet is removed are stacked, or can be accommodated in the accommodating unit 120 in a state of being wrapped in the wrapping sheet. When the sheet bundle P is accommodated in the accommodating unit 120, a plurality of sheets are stacked on a horizontally disposed bottom surface 121 (see FIG. 8) of the accommodating unit 120. In addition, the accommodating unit 120 can also accommodate consumables such as a spare toner cartridge and a stapler needle of a finisher. Hereinafter, items to be accommodated in the accommodating unit 120 may be collectively referred to as an article.

The accommodating unit 120 includes an opening 122 through which an article is put in or out of the accommodating unit 120. Walls surrounding an internal space of the accommodating unit 120 may surround a space other than the opening 122 without a gap, or may be a part of a frame of the monochrome multifunction device 110 adjacent to the space S. That is, the accommodating unit 120 may has an internal space sealed by closing the opening, or may has a structure having a gap in which the space S is surrounded by a structure such as a frame. The opening 122 of the accommodating unit 120 is located, for example, at a position facing an inner surface of a front cover 101 of the housing 100 of the monochrome multifunction device 110. That is, the opening 122 is in a front surface of the accommodating unit 120.

Further, the accommodating unit 120 includes a lid body 124 that opens or closes the opening 122. When the article is put in or out of the accommodating unit 120, the lid body 124 on the front surface of the accommodating unit 120 is open in a state in which the front cover 101 provided on the front surface of the housing 100 of the monochrome multifunction device 110 is open as shown in the drawing. The lid body 124 of the accommodating unit 120 cannot be open in a state in which the front cover 101 is closed (not shown). In the state in which the front cover 101 is closed, the lid body 124 of the accommodating unit 120 faces the inner surface of the front cover 101.

Figure 5:
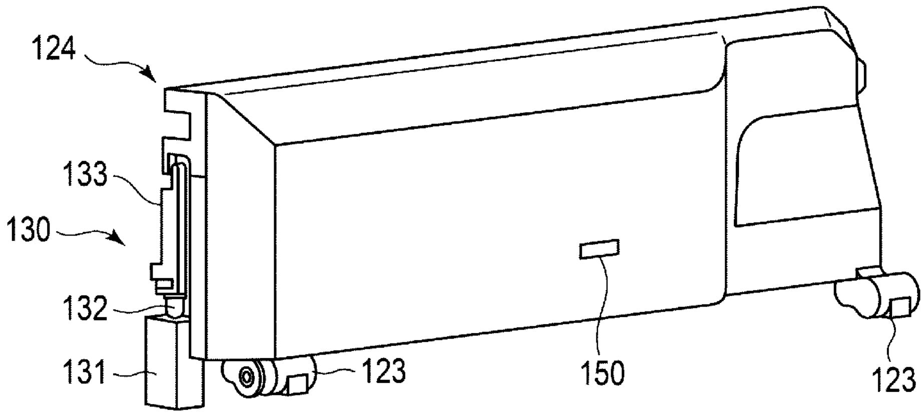
FIG. 5 is a perspective view showing the lid body.

As shown in FIG. 5, the lid body 124 includes two hinges 123 for rotatably attaching the lid body 124 to the frame (not shown) of the monochrome multifunction device 110. The hinges 123 are located at a lower end of the lid body 124 at positions separated from each other in a longitudinal direction of the lid body 124 (left-right direction in the drawing). The lid body 124 is rotatable around the hinges 123 between a closed position where the opening 122 of the accommodating unit 120 is closed and an open position where the opening 122 is open. The lid body 124 can be fixed in the closed position by using a magnet or the like. FIG. 3 shows a state in which the front cover 101 is open and the lid body 124 is fixed in the closed position.

The monochrome multifunction device 110 includes a lock mechanism 130 for locking the lid body 124 disposed in the closed position. The lock mechanism 130 includes a solenoid 131 attached to the frame (not shown) of the monochrome multifunction device 110. The solenoid 131 is fixed to the frame in a direction in which a plunger 132 protrudes vertically upward. The lock mechanism 130 includes a key rod 133 fixed to the plunger 132 of the solenoid 131. The key rod 133 protrudes vertically upward. Further, the lock mechanism 130 includes a spring (not shown) that urges the key rod 133 vertically upward.

Figure 6:
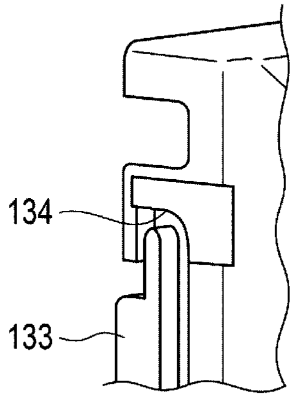
FIG. 6 is a partially enlarged perspective view showing a state in which the lid body is locked by a lock mechanism.
Figure 7:
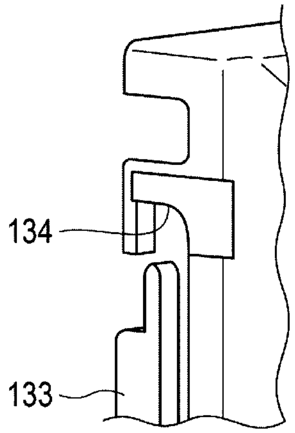
FIG. 7 is a partially enlarged perspective view showing a state in which the lid body is unlocked.

In a state in which the lid body 124 is disposed in the closed position and the solenoid 131 is turned off, as shown in FIG. 6, the key rod 133 is pushed upward by a urging force of the spring, and a tip of the key rod 133 fits into a key groove 134 provided in the lid body 124. In this state, the lock mechanism 130 locks the lid body 124 in the closed position. On the other hand, when the solenoid 131 is turned on, as shown in FIG. 7, the key rod 133 is pulled downward away from the key groove 134, and the tip of the key rod 133 is disengaged from the key groove 134. In this state, the lock mechanism 130 unlocks the lid body 124, and the lid body 124 can rotate to the open position.

Figure 8:
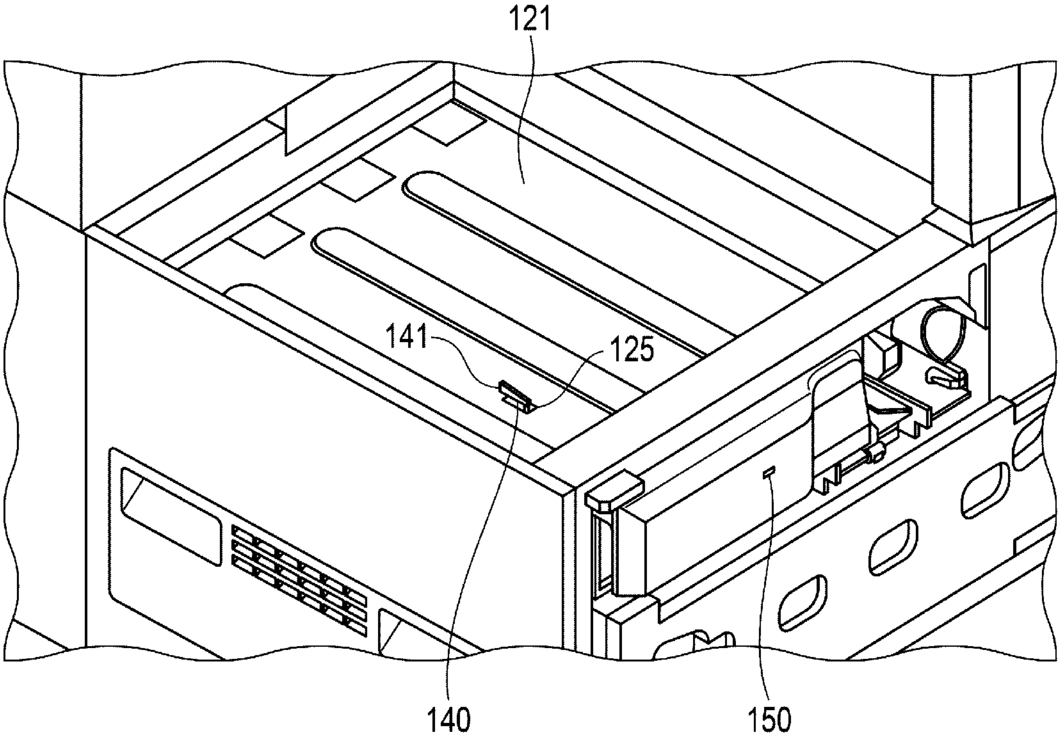
FIG. 8 is a perspective view showing a bottom surface of the accommodating unit.
Figure 9:
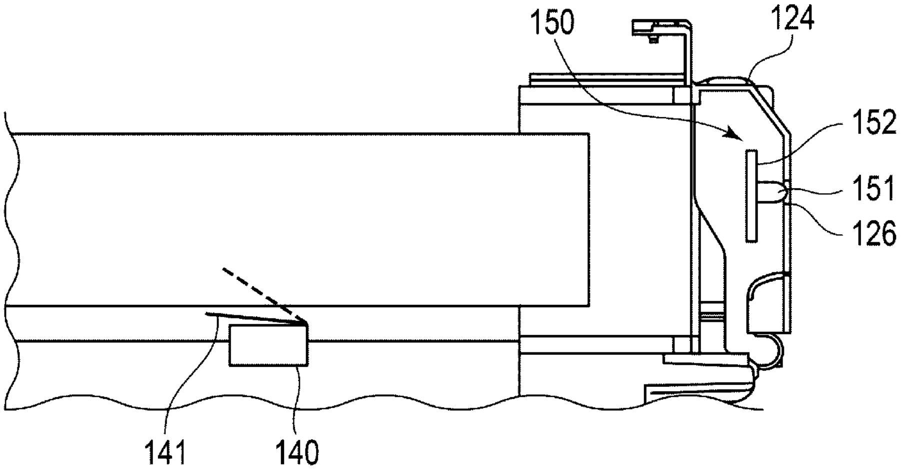
FIG. 9 is a cross-sectional view of the accommodating unit.

As shown in FIGS. 8 and 9, the monochrome multifunction device 110 also includes a detection unit 140 and a display unit 150. The detection unit 140 detects whether an article is accommodated in the accommodating unit 120. The display unit 150 detects that an article is accommodated in the accommodating unit 120 or that an article is not accommodated in the accommodating unit 120. Here, it is assumed that the article to be accommodated in the accommodating unit 120 is the sheet bundle P in which a plurality of sheets are stacked.

The detection unit 140 includes a detection lever 141 that can protrude into the accommodating unit 120 through a hole 125 provided in the bottom surface 121 of the accommodating unit 120 and that can be retracted in the hole 125. The detection unit 140 includes a spring (not shown) that urges the detection lever 141 from a retracted position shown by a solid line in FIG. 9 where the detection lever 141 is retracted in the hole 125 toward a protruding position shown by a broken line in FIG. 9 where the detection lever 141 protrudes upward from the bottom surface 121 of the accommodating unit 120. The detection unit 140 includes a switch (not shown) that is switched when the detection lever 141 is disposed in the retracted position against the urging force of the spring.

When the sheet bundle P is accommodated in the accommodating unit 120, the detection lever 141 protruding from the bottom surface 121 into the accommodating unit 120 due to the urging force of the spring is pushed downward by the weight of the sheet bundle P and moves to the retracted position. In this case, the detection unit 140 detects, by switching the switch by the detection lever 141, that the sheet bundle P is accommodated in the accommodating unit 120. The structure of the detection unit 140 is not limited to the present embodiment, and may be, for example, one using a reflection type optical sensor.

The display unit 150 has a structure in which, for example, a LED light emitting element 151 is mounted on a substrate 152. The display unit 150 is located on, for example, an inner side of a front plate of the lid body 124 of the accommodating unit 120. The front plate of the lid body 124 includes a rectangular window portion 126 that transmits light emitted from the LED light emitting element 151 of the display unit 150. The display unit 150 is fixed at a position where the LED light emitting element 151 faces the window portion 126 of the lid body 124.

The LED light emitting element 151 of the display unit 150 can be turned on or off. Further, the LED light emitting element 151 can be turned on in red or in green, for example. The display unit 150 is turned on, for example, when the sheet bundle P is accommodated in the accommodating unit 120, and is turned off when the sheet bundle P is not accommodated in the accommodating unit 120. In the state in which the front cover 101 of the monochrome multifunction device 110 is closed, the display unit 150 is turned off even when the sheet bundle P is accommodated in the accommodating unit 120.

A user can determine that the sheet bundle P is accommodated in the accommodating unit 120 when the front cover 101 of the monochrome multifunction device 110 is open if the display unit 150 provided on the lid body 124 of the accommodating unit 120 is turned on. Moreover, the user can determine that the sheet bundle P is not accommodated in the accommodating unit 120 when the front cover 101 of the monochrome multifunction device 110 is open if the display unit 150 provided on the lid body 124 of the accommodating unit 120 is turned off.

Figure 10:
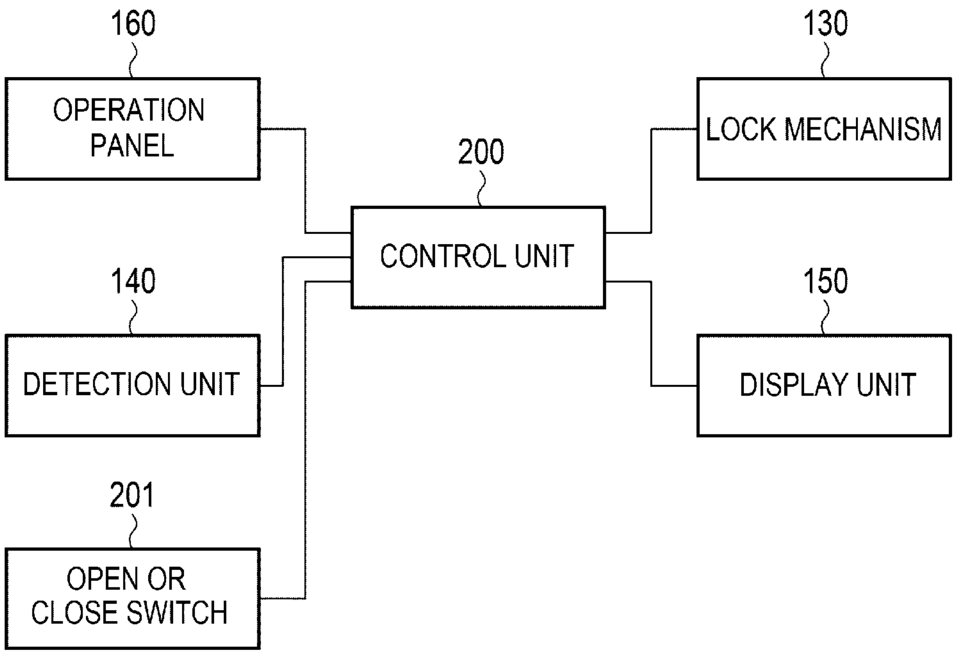
FIG. 10 is a block diagram of a control system that controls the lock mechanism in FIG. 5 and a display unit in FIG. 9.

As shown in FIG. 10, the monochrome multifunction device 110 includes a control unit 200 that controls the lock mechanism 130 and the display unit 150 described above.

The control unit 200 controls locking and unlocking by the lock mechanism 130 in response to a command input by the user via, for example, an operation panel 160 of the monochrome multifunction device 110. In this case, the control unit 200 can also acquire identification information about the user via the operation panel 160 and manage who is the user unlocking the accommodating unit 120. In the present embodiment, the control unit 200 controls the lock mechanism 130 based on the input of the identification information via the operation panel 160 to lock or unlock the lid body 124 of the accommodating unit 120. Accordingly, it is possible to expect an effect of preventing the sheet from being picked up from the sheet bundle P accommodated in the accommodating unit 120 without permission.

Further, as in the present embodiment, by providing the lock mechanism 130, which cannot perform unlocking unless the identification information about the user is input via the operation panel 160, on the lid body 124 of the accommodating unit 120, a problem that the lid body 124 of the accommodating unit 120 is inadvertently open can be prevented. Accordingly, in the state in which the front cover 101 of the monochrome multifunction device 110 is open when replacing the toner cartridge or the like, the lid body 124 of the accommodating unit 120 can be prevented from being mistakenly open, and a problem that outside air flows into the accommodating unit 120 can be prevented. Thus, according to the present embodiment, a temperature and a humidity in the accommodating unit 120 can be maintained in an appropriate state.

Since the accommodating unit 120 is located in the space S in which the three toner cartridges 11, 12, and 13 of the color multifunction device 10 are accommodated, the temperature and the humidity are controlled to be suitable for accommodating the sheet. That is, the temperature and the humidity are controlled by a temperature and humidity sensor or the like at a place where the toner cartridge is disposed, and air circulation by using a fan or the like and temperature control during preheating of a damp heater or the fixing device 50 are performed. Thus, the accommodating unit 120 is a more suitable place for accommodating the sheet as compared with other places in the housing 100.

In this way, when the sheet is accommodated in the accommodating unit 120 which is not inadvertently open, problems that cause wrinkles and curls on the sheet due to changes in temperature and humidity can be prevented, and the sheet can be stored in an appropriate environment. Further, as described above, since the bottom surface 121 of the accommodating unit 120 is horizontally disposed, problems that the sheet bundle P is biased in the accommodating unit 120 do not occur, and the sheet is not folded or bent. Thus, for example, when the sheet picked up from the accommodating unit 120 is fed to the monochrome multifunction device 110 via the manual feed tray 2, problems such as conveyance jam are unlikely to occur, and stable sheet conveyance is possible.

Further, the control unit 200 controls the display unit 150 as described above based on the detection result of the detection unit 140. The control unit 200 may also detect an open or closed state of the front cover 101 of the monochrome multifunction device 110 via an open or close switch 201 and control the display unit 150 in conjunction with the opening or closing of the front cover 101.

In this case, for example, when the opening of the front cover 101 via the open or close switch 201 is detected, the control unit 200 turns on the display unit 150 based on the detection of the detection unit 140 of the accommodating unit 120 that the sheet bundle P is accommodated. Further, when the opening of the front cover 101 via the open or close switch 201 is detected, the control unit 200 turns off the display unit 150 based on the detection of the detection unit 140 of the accommodating unit 120 that the sheet bundle P is not accommodated. In the state in which the front cover

101 is closed, the control unit 200 turns off the display unit 150 regardless of the detection result of the detection unit 140.

The control unit 200 may also control the display unit 150 in conjunction with the lock mechanism 130 that locks the lid body 124 of the accommodating unit 120. That is, when the lid body 124 is locked in the closed position by the lock mechanism 130, the control unit 200 may turn on the display unit 150 in red. Further, when the lid body 124 is unlocked by the lock mechanism 130, the control unit 200 may turn on the display unit 150 in green.

As described above, since the monochrome multifunction device 110 in the present embodiment includes the accommodating unit 120 in the space S to which the three toner cartridges 11, 12, and 13 in the color multifunction device 10 can be mounted, the space S can be effectively used as a storage place for the sheet. According to the present embodiment, since the accommodating unit 120 is provided in the place where the toner cartridges 11, 12, and 13 are provided, the temperature and the humidity in the accommodating unit 120 can be set to appropriate values, an environment suitable for storing the sheet can be provided, and problems such as curls and wrinkles of the sheet can be prevented. Further, when the accommodating unit 120 is not provided in the space S, a lid member or the like for closing the space S such that the user cannot access the space S is unnecessary, and there is no need to add unnecessary components.

According to the present embodiment, since the lid body 124 of the accommodating unit 120 can be locked at the closed position, a problem that the lid body 124 of the accommodating unit 120 is mistakenly open due to a toner cartridge replacement work or the like in a state in which the front cover 101 of the monochrome multifunction device 110 is open. Accordingly, the problem that the lid body 124 is open and the temperature and the humidity inside the accommodating unit 120 change can be prevented, and the problems such as curls and wrinkles of the sheet accommodated therein can be prevented. By making the lid body 124 lockable, the sheet and other articles accommodated in the accommodating unit 120 can be prevented from being picked up without permission.

According to the present embodiment, since the detection unit 140 is provided at the bottom of the accommodating unit 120, and the display unit 150 is provided on the lid body 124 of the accommodating unit 120, when the front cover 101 of the monochrome multifunction device 110 is open, whether an article such as a sheet is accommodated in the accommodating unit 120 can be determined in the state in which the lid body 124 is closed, and convenience for the user can be improved.

In the embodiment described above, the case in which the accommodating unit 120 is provided in the space S from which the three toner cartridges 11, 12, and 13 other than the black toner cartridge of the color multifunction device are removed is described, but the embodiment is not limited to this. For example, a similar accommodating unit can be provided in the space from which the image forming units 21, 22, and 23 other than the black toner cartridge of the color multifunction device 10 are removed. In this case, instead of the accommodating unit 120 described above, the accommodating unit can be disposed next to the image forming unit 24 for black. Alternatively, in addition to the accommodating unit 120 described above, the accommodating unit may be disposed next to the image forming unit 24 for black.

Figure 11:
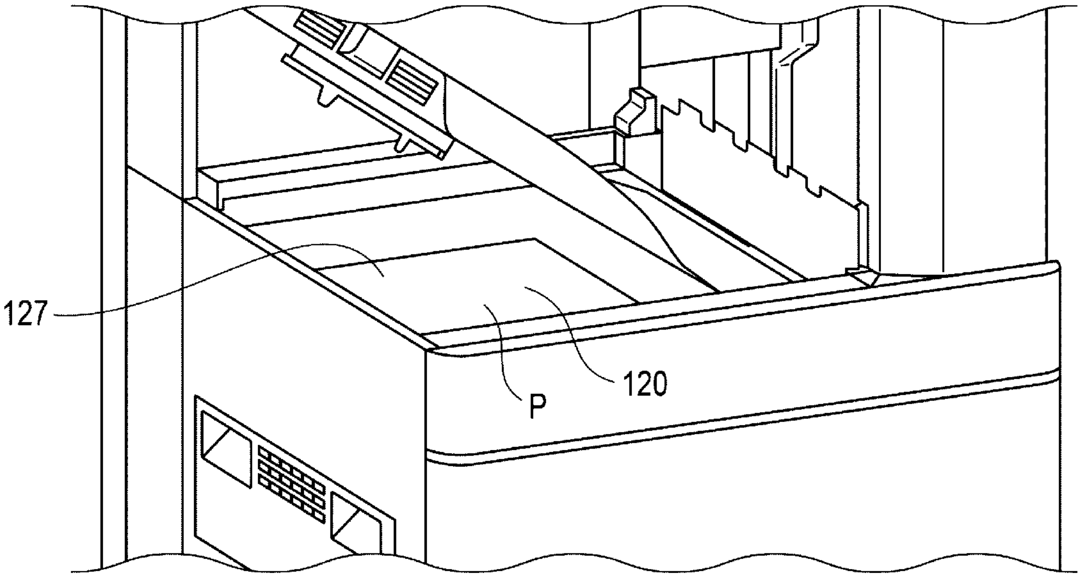
FIG. 11 is a perspective view showing an embodiment in which an opening is provided in an upper surface of the accommodating unit of the monochrome multifunction device.
Figure 12:
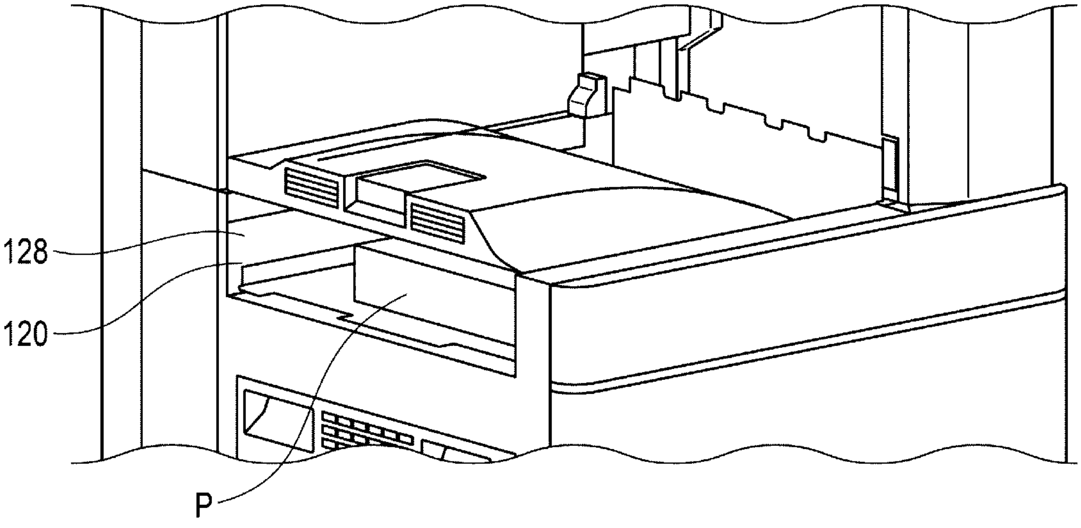
FIG. 12 is a perspective view showing an embodiment in which an opening is provided on a side surface.

In the embodiment described above, the case in which the opening 122 is provided in the front surface of the accommodating unit 120 is described, but the embodiment is not limited to this. For example, an opening 127 may be provided in an upper surface of the accommodating unit 120 as shown in FIG. 11, or an opening 128 may be provided in a side surface of the accommodating unit 120 as shown in FIG. 12. When the opening 127 is provided on the upper surface of the accommodating unit 120, for example, the sheet discharge tray 61 can be opened or closed as shown in the drawing. In this case, the sheet discharge tray 61 functions as a lid body for opening or closing the internal space of the accommodating unit 120. When the opening 128 is provided on the side surface of the accommodating unit 120, the opening 128 is provided on the side surface opposite to the black toner cartridge 14. A lid body (not shown) is provided on the opening 128. When the opening 127 or 128 is provided in the upper surface or the side surface of the accommodating unit 120, the accommodating unit 120 can be opened or closed without opening the front cover 101 of the monochrome multifunction device 110.

Figure 13:
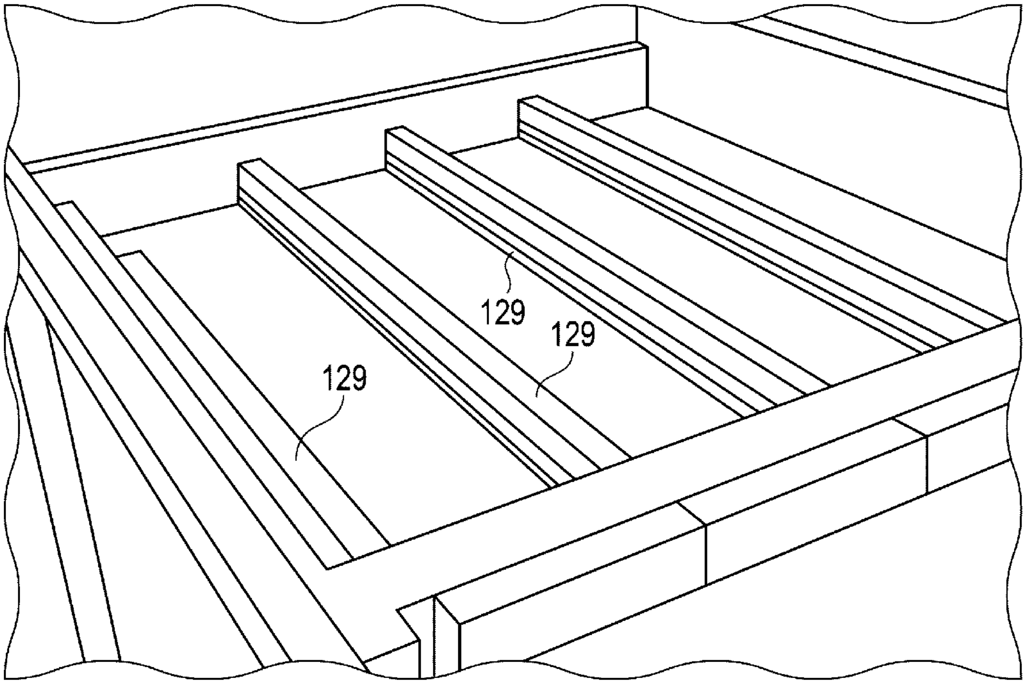
FIG. 13 is a perspective view showing an embodiment in which an internal space of the accommodating unit is subdivided by partition plates.

In the embodiment described above, the case in which the internal space of the accommodating unit 120 is used as one space is described, but the embodiment is not limited to this. For example, as shown in FIG. 13, the internal space of the accommodating unit 120 may be subdivided into a plurality of sections by using a plurality of partition plates 129.

Figure 14:
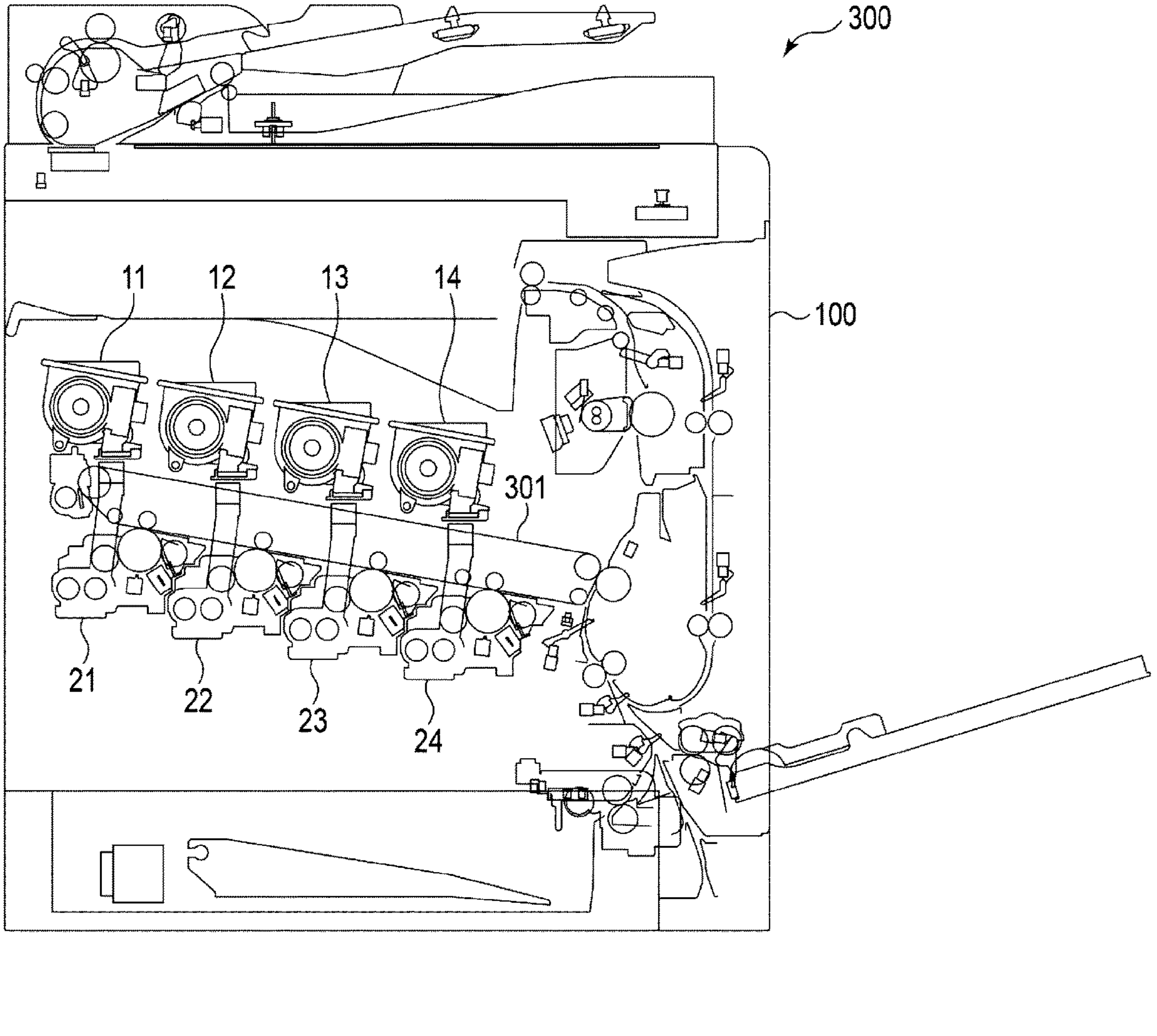
FIG. 14 is a schematic view showing an example of an image forming device in which a transfer belt is diagonally disposed.

The monochrome multifunction device 110 in the present embodiment includes the transfer belt 31 extending in the horizontal direction. Alternatively, for example, as shown in FIG. 14, a monochrome multifunction device in which unnecessary components are removed from a color multifunction device 300 including a transfer belt 301 tilted with respect to the horizontal direction can also be applied. In this case, for example, the accommodating unit 120 may be provided in a space from which the three toner cartridges 11, 12, and 13 other than the black toner cartridge are removed. Since the transfer belt 301 is tilted with respect to the horizontal direction, the space in which the three toner cartridges 11, 12, and 13 are disposed is also tilted, but the bottom surface 121 of the accommodating unit 120 can be horizontally disposed.

While certain embodiment has been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming device, comprising:

an image forming component configured to form a toner image having at least one color;

a first toner cartridge that accommodates a toner having a first color to be supplied to the image forming component;

an accommodating component provided in a space where at least one toner cartridge accommodating a toner having a second color different from the first color to be supplied to the image forming component is arrangeable side by side with the first toner cartridge;

a transfer belt disposed to be moveable through the image forming component, disposed to face the first toner cartridge and the accommodating component, and configured to transfer the toner image formed by the image forming component; and a housing configured to accommodate the image forming component, the first toner cartridge, the accommodating component, and the transfer belt, wherein the accommodating component comprises an opening through which an article is put in or out of the accommodating component and a lid body configured to open or close the opening, and the opening and the lid body of the accommodating component are located on a front surface of the accommodating component facing an inner surface of a front cover of the housing.

2. The image forming device according to claim 1, wherein the first toner cartridge and the accommodating component face the transfer belt above the transfer belt, and the opening of the accommodating component is located on an upper surface of the accommodating component.

3. The image forming device according to claim 1, wherein the opening of the accommodating component is located on a side surface of the accommodating component opposite to the first toner cartridge.

4. The image forming device according to claim 1, wherein the accommodating component has a horizontally disposed bottom surface.

5. The image forming device according to claim 4, wherein the accommodating component accommodates a plurality of sheets in a stacked manner on the bottom surface.

6. The image forming device according to claim 1, further comprising:

a detector configured to detect a presence or absence of an article accommodated inside the accommodating component;

a display component configured to display the presence or absence of the article accommodated inside the accommodating component; and a controller configured to control the display component according to a detection result of the detector.

7. The image forming device according to claim 6, further comprising:

a housing configured to accommodate the image forming component, the first toner cartridge, the accommodating component, and the transfer belt, wherein in a state in which a front cover of the housing is closed, the controller turns off the display component regardless of the detection result of the detector.

8. The image forming device according to claim 1, further comprising:

an input component configured to input identification information about a user;

a lock mechanism configured to lock or unlock a lid body of the accommodating component; and a controller configured to control the lock mechanism to lock or unlock the lid body of the accommodating component based on the input of the identification information by the input component.

9. A color multifunction device, comprising:

an image forming component configured to form a toner image having at least one color;

a black toner cartridge that accommodates a black toner to be supplied to the image forming component;

an accommodating component provided in a space where at least one toner cartridge accommodating a toner having a color different from black to be supplied to the image forming component is arrangeable side by side with the first toner cartridge;

a transfer belt disposed to be moveable through the image forming component, disposed to face the black toner cartridge and the accommodating component, and configured to transfer the toner image formed by the image forming component; and a housing configured to accommodate the image forming component, the black toner cartridge, the accommodating component, and the transfer belt, wherein the accommodating component comprises an opening through which an article is put in or out of the accommodating component and a lid body configured to open or close the opening, and the opening and the lid body of the accommodating component are located on a front surface of the accommodating component facing an inner surface of a front cover of the housing.

10. The color multifunction device according to claim 9, wherein the black toner cartridge and the accommodating component face the transfer belt above the transfer belt, and the opening of the accommodating component is located on an upper surface of the accommodating component.

11. The color multifunction device according to claim 9, wherein the opening of the accommodating component is located on a side surface of the accommodating component opposite to the black toner cartridge.

12. The color multifunction device according to claim 9, wherein the accommodating component has a horizontally disposed bottom surface.

13. The color multifunction device according to claim 12, wherein the accommodating component accommodates a plurality of sheets in a stacked manner on the bottom surface.

14. The color multifunction device according to claim 9, further comprising:

a detector configured to detect a presence or absence of an article accommodated inside the accommodating component;

a display component configured to display the presence or absence of the article accommodated inside the accommodating component; and a controller configured to control the display component according to a detection result of the detector.

15. The color multifunction device according to claim 14, further comprising:

a housing configured to accommodate the image forming component, the black toner cartridge, the accommodating component, and the transfer belt, wherein in a state in which a front cover of the housing is closed, the controller turns off the display component regardless of the detection result of the detector.

16. The color multifunction device according to claim 9, further comprising:

an input component configured to input identification information about a user;

a lock mechanism configured to lock or unlock a lid body of the accommodating component; and a controller configured to control the lock mechanism to lock or unlock the lid body of the accommodating component based on the input of the identification information by the input component.

* * * * *